United States Patent [19]

Nakamura

[11] Patent Number: 4,716,411
[45] Date of Patent: Dec. 29, 1987

[54] THERMOELECTRIC THERMOMETER OF RADIO TRANSMISSION TYPE

[76] Inventor: Tokio Nakamura, 6-50, Kurakuen Yonban-cho, Nishinomiya-shi, Hyogo-ken, Japan

[21] Appl. No.: 859,498

[22] Filed: May 5, 1986

[51] Int. Cl.$^4$ .................. G08C 19/12; G08C 19/16
[52] U.S. Cl. .................... 340/870.17; 374/179
[58] Field of Search ............. 340/870.17, 870.11, 340/596, 593; 374/179, 182

[56] References Cited

U.S. PATENT DOCUMENTS

| | | | |
|---|---|---|---|
| 3,582,921 | 6/1971 | Krieger | 340/870.17 |
| 3,651,405 | 3/1972 | Whitney et al. | 340/870.17 |
| 4,518,839 | 5/1985 | Taguchi et al. | 340/870.17 |
| 4,552,465 | 11/1985 | Anderson | 374/179 |

FOREIGN PATENT DOCUMENTS 0057226  4/1982  Japan ................ 340/870.17

Primary Examiner—John W. Caldwell, Sr.
Assistant Examiner—Tyrone Queen
Attorney, Agent, or Firm—George B. Oujevolk

[57] ABSTRACT

A thermoelectric thermometer of the radio transmission type incorporating a thermocouple for measuring the temperature of an object having a relatively high temperature, such as metal in a molten state or being heat-treated. A signal representing the temperature measured is transmitted by radio waves and received at a desired location away from the hot object to remotely detect the temperature of the object.

1 Claim, 2 Drawing Figures

THERMOELECTRIC THERMOMETER OF RADIO TRANSMISSION TYPE

BACKGROUND OF THE INVENTION

The present invention relates to a thermoelectric thermometer for measuring the temperature of a hot object, such as the molten metal in blast furnaces or smelting furnaces or metal being heat-treated for hardening or tempering.

Generally, there arises a need to detect the temperature of an object at a location away from the position of temperature measurement for controlling the temperature of the object according to the detected temperature.

For measuring high temperatures (e.g. 300° C. to 1300° C.), a thermoelectric thermometer is used which comprises a thermocouple. One junction of the thermocouple is held at 0° C. or room temperature to measure the thermoelectromotive force developed in the thermocouple, whereby the high temperature can be measured accurately.

However, the environment in which such a high temperature is to be measured is hot, hazardous and not readily accessible, so that it is difficult to frequently measure the temperature in the adverse environment for the control of temperature.

Accordingly, it is conventional practice to connect the thermocouple, serving as a measuring instrument, to an indicator by a compensation conductor to indicate the temperature at a location away from the hot object.

Nevertheless, there is a limitation to the length of the compensation conductor which is invariably needed for thermometers of the thermocouple type since the thermoelectric thermometer is adapted to measure temperatures by measuring the thermoelectromotive force in the thermocouple.

Stated more specifically, an increase in the distance between the thermocouple and the indicator requires a longer compensation conductor, making it impossible to accurately indicate the measured temperature owing to the influence of the conductor resistance and the influence of the temperature difference between the position of measurement and the position of cold junction compensation.

Furthermore, it is impossible to increase the number of indicators easily or to shift the indicator because it is then necessary to shift the compensation conductor similarly.

SUMMARY OF THE INVENTION

The main object of the present invention is to overcome the foregoing drawbacks of the conventional thermoelectric thermometer.

More specifically, a first object of the present invention is to provide a thermoelectric thermometer capable of giving accurate measurements at a location a desired distance from the object to be measured without any limitation to the length of the compensation conductor.

A second object of the present invention is to provide an inexpensive thermoelectric thermometer which is efficiently usable because the thermometer has a freely shiftable indicating unit and is easily usable even when the object to be measured is shifted and further because the single indicating unit can be adapted to give measurements obtained at a plurality of locations.

A third object of the present invention is to provide a thermoelectric thermometer which assures high safety since the thermocouple thereof, i.e., measuring unit, can be readily installable in place.

To fulfill the above objects, the present invention provides a thermoelectric thermometer of the radio transmission type characterized in that the thermometer comprises a measuring unit for detecting the temperature of an object by a thermocouple, amplifying the resulting detection signal, converting the amplified signal to a digital signal and transmitting the digital signal wireless, and an indicating unit for receiving the transmitted signal and indicating the temperature, whereby the temperature of the object can be remotely detected by radio transmission.

According to a preferred feature of the present invention, the indicating unit is adapted to receive signals from a plurality of measuring units to indicate the temperature of a plurality of objects.

The temperature of the plurality of objects can then be controlled at a low cost at one location.

According to another preferred feature of the present invention, an identifying signal can be set in the measuring unit, and the identifying signal can be transmitted by the measuring unit along with the detection signal so that the detection signals from the measuring units other than the desired one can be excluded.

In this case, the desired one of the detection signals emitted from the plurality of measuring units can be selectively accepted by the single indicating unit. This eliminates the likelihood that some other unnecessary signal will result in an error.

According to another preferred feature of the present invention, the measuring unit comprises the thermocouple disposed at one end of its main body, a sinker for causing the thermocouple to reach the object, a transmitter for radio transmission, an electric cell for driving the transmitter and a protective tube covering these components and capable of withstanding the temperature to be measured at least for a period of time required for the measurement.

When thus constructed, the measuring unit can be of the disposable throw-in type and can be installed in place without the necessity for access to the object of high temperature.

According to another preferred feature of the present invention, the protective tube can be made of a paper material.

In this case, the measuring unit can be of the throw-in type and is disposable.

According to another preferred feature of the present invention, the protective tube can be provided with a flange.

The flange engages the measuring unit to reach the object with improved accuracy, facilitating more accurate installation of the unit.

According to another preferred feature of the present invention, the indicating unit can be adapted to emit the received signal to control the temperature of the object.

The temperature of the object is then automatically controllable from a location at a distance removed.

The objects and features of the present invention will become more apparent from the following detailed description and the accompanying drawings.

DETAILED DESCRIPTION OF THE INVENTION

Figure 1:
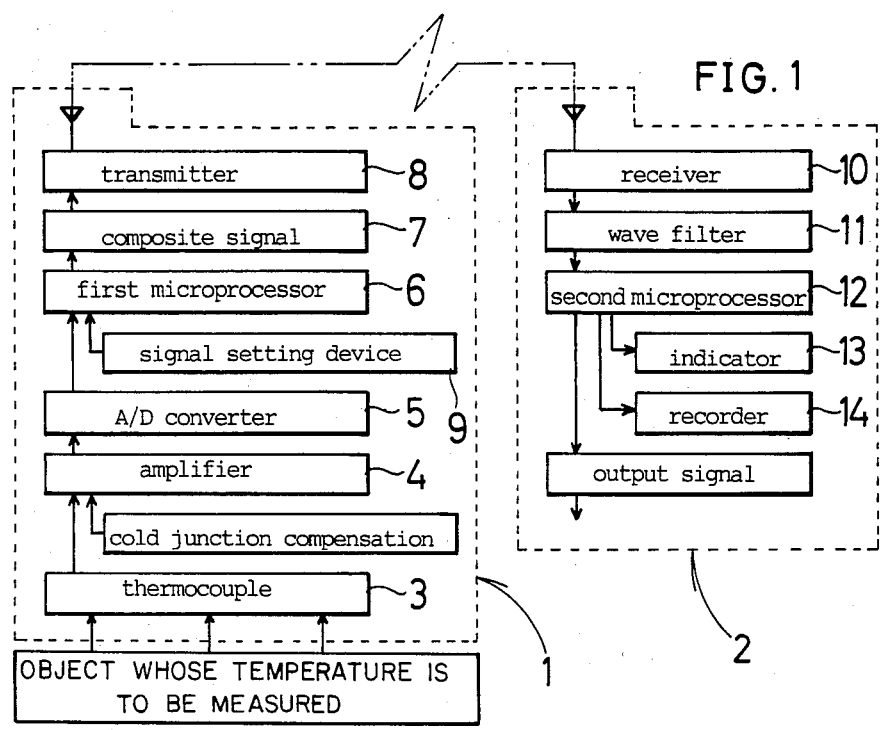
FIG. 1 is a systematic diagram showing a thermoelectric thermometer of the radio transmission type embodying the present invention.

An embodiment of the present invention will be described with reference to FIG. 1. A measuring unit 1 for detecting the temperature of an object and transmitting the measurement wirelessly comprises a thermocouple 3 for detecting the temperature of the object, an amplifier 4 for amplifying the detection signal to a desired gain, an A/D converter 5 for converting the amplified analog detection signal to a digital signal, and a first microprocessor 6 for converting the digital signal to a data signal as required for transmission and preparing a composite signal 7 from the data signal and an identifying signal specific to the measuring unit 1 and delivered from a signal setting device 9, and a transmitter 8 for transmitting the composite signal 7 by radio waves.

The identifying signal is set in the device 9, for example, by preparing an 8-bit binary code by pulse code modulation and storing the code in a ROM.

To prepare the data signal, the digital signal representing the measured temperature value is converted by pulse code modulation, for example, to an 8-bit binary code representing the temperature value.

The identifying signal, as well as the data signal, has added to its 8-bit unit a parity bit which indicates whether the total number of 1 bits in the signal is even or odd. The composite signal 7 is prepared by adding the data signal to the rear end of the identifying signal.

An indicating unit 2 is disposed at a desired location away from the measuring unit 1 by a distance (e.g. 50 to 100 m). The unit 2 comprises a receiver 10 for receiving the radio waves emitted by the transmitter 8, a modulated wave filter 11 for selecting particularly radio waves, a second microprocessor 12 for decoding the identifying signal of the composite signal 7, detecting the data signal and decoding the parity bits, an indicator 13 for showing the temperature measurement visibly, and a recorder 14 for recording the temperature value.

The second microprocessor 12 decodes the specified identifying signal only, excluding other signals, to accept the desired data signal only. The parity bit of the identifying signal, the parity bit of the data signal and the sum of the parity bits of the two signals are each checked as to whether the bit or sum is even or odd. For example, the signal with even parity is accepted, excluding other data.

The second microprocessor 12 further compares the accepted data with the previously accepted data. If the difference therebetween exceeds a predetermined difference per unit time, the current data is disregarded as an error. The microprocessor 12 gives off an alarm signal automatically, if the transmission is interrupted for a given period of time owing to a radio wave disturbance or other trouble. When required, the microprocessor is adapted to produce a control signal according to the detected temperature measurement for controlling the temperature of the object.

The indicator 13 may notify the temperature value in a synthesized voice, or may be adapted to produce a voice, sound or alarm when the desired temperature is reached. Thus, it is not always necessary to give a visible indication.

Figure 2:
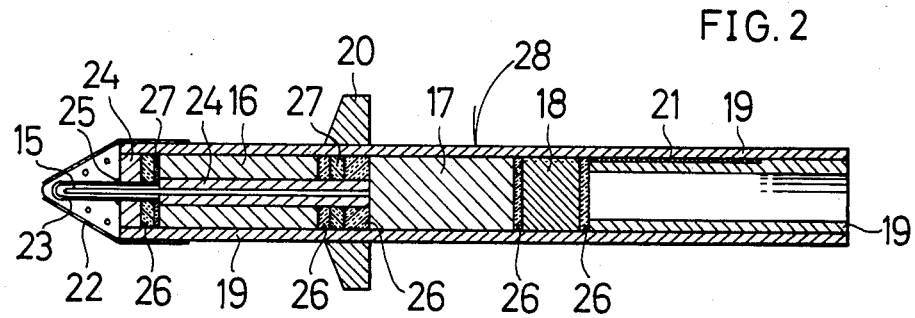
FIG. 2 is a fragmentary view in longitudinal section showing another embodiment of the invention.

Another embodiment of the present invention will be described with reference to FIG. 2, which shows a measuring unit main body 28 of the throw-in type which can be installed in place by throwing. The main body 28 has the following construction.

A thermocouple 15, which is disposed at one end of the main body 28, is protected with a sharp-pointed protective cover 22 so as to readily penetrate through a layer of oxide, etc. on the surface of molten metal and is further protected with an insulator 24 and the like.

A transmitter 17 is housed in the midportion of a protective tube 19 made of laminated paper. The transmitter is connected to the thermocouple 15 and has an electric cell 18 as its power supply to transmit the temperature detection signal from the thermocouple 15 by radio waves of desired frequency via an antenna 21.

A sinker 16 is provided between the thermocouple 15 and the transmitter 17. The weight of the sinker 16 is determined according to the specific gravity or the like of the object. Usually the assembly of the thermocouple 15 and the sinker 16 is immersed in the liquid object, such as molten metal to measure the temperature thereof.

A flange 20 is fitted around the protective tube 19 at a position between the sinker 16 and the transmitter 17. The flange 20 prevents the transmitter 17, the cell 18, etc. from sinking into the liquid object of high temperature during measurement, holding the main body 28 in a stable position. Like the protective tube 19, the flange 20 is made of laminated paper.

The shape and size of the flange 20 are determined according to the specific gravity or the like of the object. The flange may be made slidable on the protective tube 19 so as to be positioned as desired.

Indicated at 23 is a quartz tube, at 25 refractory cement, at 26 a heat insulating material such as glass wool, and at 27 a shaped heat insulating member made of glass wool, asbestos or the like, According to the present invention described above, temperature measurements are transmitted by radio waves so that the temperature of the object can be detected easily and accurately at a remote location of good environmental conditions without the necessity of reinstalling the compensation conductor every time the object or equipment therefor is shifted.

Further according to the present invention, the location where the object temperature measurement is available can be determined as desired, so that the temperature of a plurality of objects can be controlled concentrically, while a signal representing the temperature of one object can be received at a plurality of locations for detection. The temperature of the object is therefore controllable easily and reliably.

Further according to the present invention, the measuring unit, which is not connected to the indicating unit mechanically, can be installed in place easily, especially as a throw-in type instrument. The present device therefore has the advantage that it can be installed without any need for access to the object which is hot and hazardous.

The present invention is not limited to the above embodiments. When desired, for example, the measuring unit which transmits the temperature measurement may further be adapted to indicate the measurement. It is to be noted that such and other modifications can be made within the scope of the appended claims.

What is claimed is:

1. A thermoelectric thermometer for measuring the temperature of a hot environment in the range of about 300° C. to about 130⁰° C., comprising, in combination:

(a) an elongated housing with a defined front, midportion and rear, a pointed nose section at the front;
(b) an elongated thermocouple (15) with a rear part extending from said nose section into said housing midportion;
(c) a transmitter (17) in said midportion coupled to said thermocouple rear part to receive a signal therefrom;
(d) a sinker (16) disposed between said thermocouple (15) and the transmitter (17), the weight of the sinker being such that it can sink the thermometer in an environment to be measured as to its temperature;
(e) an electric cell power supply (18) coupled to the transmitter to supply power thereto;
(f) a sharp-pointed protective cover (22) covering at least the front of the thermocouple, an insulator (24) disposed around the elongated thermocouple, a flange (20) disposed around the midportion to prevent the thermocouple's transmitter (17) from sinking into the environment to be measured;
(g) amplifier means (4), analog-to-digital converter means (5) in the transmitter, to amplify the signal received from the thermocouple, with a first microprocessor (6) to convert the digital signal to a data signal; and,
(h) receiver means located some distance away from the transmitter (17), said receiver means being adapted and disposed to receive a transmitted signal from the transmitter and said receiver means including a wave filter (11) to filter the transmitted signal, a second microprocessor (12) to decode the transmitted signal, with a recorder (14) and an indicator (13) to utilize the transmitted signal.

* * * * *